Oct. 2, 1962 R. L. WHITNAH 3,056,563
TAPE CORE
Filed July 8, 1959 2 Sheets-Sheet 1

INVENTOR
RONALD L. WHITNAH
BY Carpenter, Abbott, Coulter & Kinney
ATTORNEYS

Oct. 2, 1962 R. L. WHITNAH 3,056,563

TAPE CORE

Filed July 8, 1959 2 Sheets-Sheet 2

INVENTOR
RONALD L. WHITNAH
BY
Carpenter, Abbott, Coulter & Kinney
ATTORNEYS

United States Patent Office 3,056,563
Patented Oct. 2, 1962

3,056,563
TAPE CORE

Ronald L. Whitnah, White Bear Lake, Minn., assignor to Minnesota Mining and Manufacturing Company, St. Paul, Minn., a corporation of Delaware
Filed July 8, 1959, Ser. No. 825,761
8 Claims. (Cl. 242—71.8)

This invention relates to cores for convolutely wound strip material such as magnetic recording tape, pressure-sensitive adhesive tape, ribbon material, and the like. Of particular importance are plastic cores which may be fitted with flanges or formed with flanges to provide reels for magnetic recording tape.

Virtually all plastic reels for magnetic recording tape are formed of two separately molded sections, in spite of the substantial saving which could be effected by means of one-piece molding. Manufacturers have continued to produce two-piece reels since one-piece reels available prior to this invention had fundamental defects, one of which was lack of strength. The additive tension of successive layers of tape wound on a weak reel would deflect its flanges to cause them to interfere with further winding. When the strength was bolstered by using thicker sections of plastic, uneven cooling in molding the one-piece reel would cause warping and leave depressions in the surfaces at the bolstered areas. The realization of a satisfactorily smooth winding surface without subsequent machining operations was a particularly vexing problem.

Essentially the same difficulties have plagued the production of flangeless cores, which are primarily used by magnetic recording tape manufacturers simply to hold tape for shipment, the customer transferring the tape to flanged reels according to his individual needs. Typically, 5000 feet of tape may be wound on a 4-inch core to a diameter of 14 inches, and the total load is sometimes so great that a weak core will explode. To provide adequate strength, it has often been necessary to assume the added expense of glass-filament reinforcement, even though the core is usually discarded as soon as the tape is transferred to flanged reels.

Because of shortcomings in commercially available plastic cores and reels, many users are willing to shoulder the much higher cost of metal cores and reels formed of metal cores to which are bolted metal flanges. Although the tape core of this invention could be formed of metal, it is believed that even the most fastidious user will accept the core in molded plastic. He may insist that it be fitted with metal flanges, but the novel tape core molded of plastic has sufficient strength and dimensional stability to replace metal cores now in use, and even without fibrous reinforcement, the novel plastic core may be as strong as reinforced-plastic one-piece cores of the prior art.

Briefly, the novel tape core comprises a cylindrical outer rim, the diameter of which is at least as great as its width, a cylindrical inner rim concentric with the outer rim, and a framework joining said outer and inner rims and integral therewith. The framework comprises a substantially continuous web of uniform thickness alternating symmetrically from crowns at one side of the outer rim to crowns at the other side. To lend adequate support to the outer rim, the average slope of the web between a crown at one side of the outer rim and the adjacent crown at the other side should not be less than about 25 degrees with respect to the edge of the outer rim. On the other hand, if the average slope is more than about 65 degrees, less strength is realized than is desirable for a given amount of raw material. That is, the average slope of the web between each crown at one side of the outer rim and an adjacent crown at the other side should lie within the range of 25–65° to the edge of the outer rim. In any event, the circumferential distance between the centers of adjacent crowns at the outer rim should not exceed 3 times the width of the rim, or the rim will have less support than is desired for the most important envisioned uses. For minimum support of the outer rim, the web should include at least three crowns on each side of the core.

It is not essential that the web extend to the edges of the outer rim, but should traverse at least half the width of the rim and preferably reach or nearly reach the edges. Also, it is unnecessary that the web alternate across the inner cylindrical rim, but the crowns could converge to a circular line at the inner rim, in which case the inner rim might be no wider than the thickness of the web. However, for greater dimensional stability and better distribution of compressive stresses incurred on winding strip material on the core, the web should alternate symmetrically at the inner rim at about the same amplitude as at the outer rim. Moreover, for use as a pressure-sensitive adhesive tape core, it is preferred that the inner rim extend over the full width of the core so that the core can be used on any tape dispenser. It is also preferred that the distance across each crown be small and that the slope of the web between adjacent crowns be approximately 45 degrees to the edge of the outer rim so that the rim is supported as fully as possible, commensurate with economy of raw material. A tape core embodying these preferred features is illustrated in the drawing in which:

Figure 1:
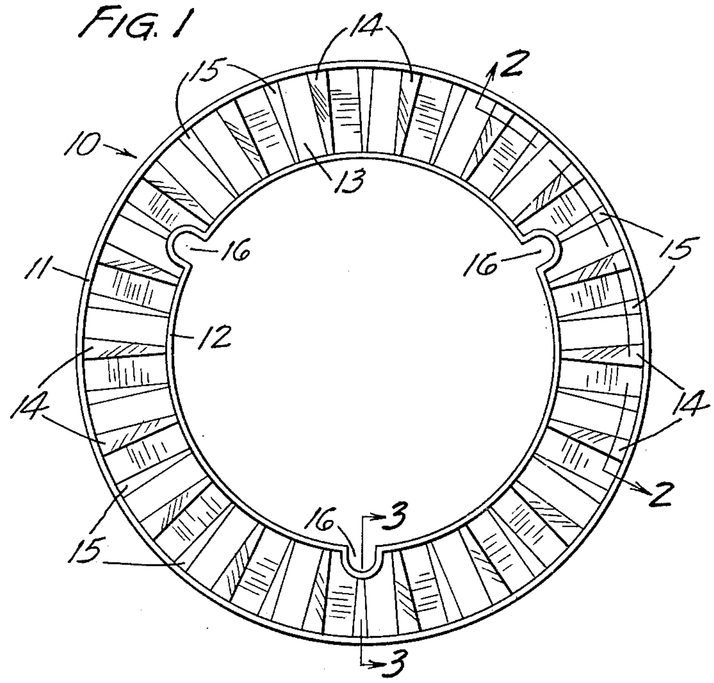
FIG. 1 is a plan view of a preferred tape core of this invention.
Figure 2:
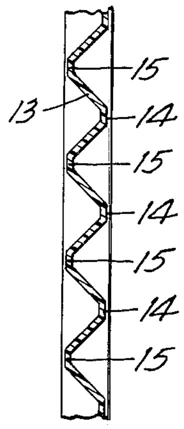
FIG. 2 is a developed cross section along line 2—2 of FIG. 1.
Figure 3:
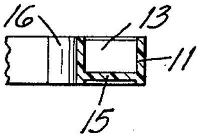
FIG. 3 is an enlarged cross section at line 3—3 of FIG. 1.

Referring in detail to the drawing, the one-piece molded plastic core 10 shown in FIGS. 1–3 consists of a cylindrical outer rim 11, a cylindrical inner rim 12 concentric with the outer rim 11, and a continuous web 13 joining the two rims. As shown in FIG. 2, the web 13 is of uniform thickness identical to that of the rims 11 and 12 so that the molded plastic cools evenly and there is no danger of warping or uneven shrinkage. The web 13 alternates symmetrically from one side of each rim to the other to define short flat crowns, numbered 14 on one side and 15 on the other. The slope of the web between each of the crowns 14 and the adjacent crown 15 is about 45 degrees with respect to the edge of the outer rim 11.

The inner rim 12 is formed to provide three semicircular openings 16 which engage drive-pins of a magnetic tape recorder. It is noted in passing that the uniform nature of the web 13 would make it convenient to drive the core 10 from a mating pinion.

Figures 4, 5, 6:
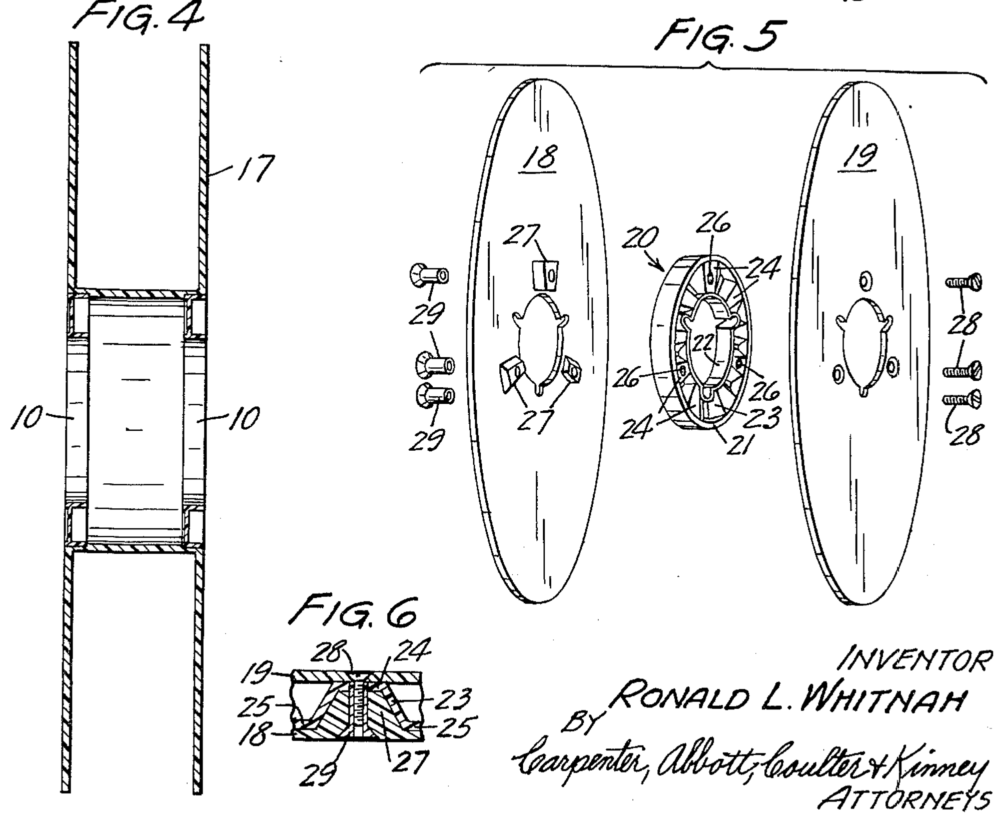
FIG. 4 is a central cross section of a reel in which a pair of the cores of FIG. 1 are used to strengthen the reel and to provide means for rotatably mounting the reel on a magnetic tape recorder.
FIG. 5 is an exploded view in perspective showing the construction of a reel for magnetic recording tape using a core similar to that shown in FIG. 1 and a pair of separately formed flanges.
FIG. 6 is an enlarged central cross section at one of the bolts of the assembled reel of FIG. 5.

The core 10 is primarily intended for use by the manufacturer of magnetic recording tape for temporary storage and shipment of the tape to a purchaser who intends to rewind the tape onto flanged reels. Another use is illustrated in FIG. 4, i.e., to support a large flanged reel 17, on which wide magnetic recording tape will be wound for use in recording television signals. By using the cores 10 for strength and to engage the driving pins of the recording mechanism, the reel 17 can be relatively flimsy and thus easy to mold of plastic at high production rates. Conveniently, the cores 10 are cemented to the reel 17.

As shown in FIGS. 5 and 6, a core such as the core 10 of FIGS. 1–3 may serve as the hub of a reel provided with separately formed flanges 18 and 19. The illustrated core 20 is of slightly different design for this use. For example, the web 23 of the core 20 is formed with slightly broader crowns 24 and 25, as shown in FIG. 6, so that the holes 26 in the crowns 24 are smaller than the breadth of the crowns, to provide firm support where the crowns 24 contact the flange 19. Also the crowns 24 and 25 coincide with the edges of each of the rims 21 and 22 to provide fuller support for the flanges 18 and 19 in the assembled reel.

The flange 18 is formed with three projections 27 which mate with valleys formed by the web 23 opposite the crowns 24. Alternatively, the projections could be adhered to the flange 18 or simply inserted in place during assembly of the reel. If the flanges 18 and 19 were plastic, they could simply be cemented to the core 20. Metal flanges should be bolted to the core, as illustrated in FIGS. 5 and 6, using flat-head nuts 28 and bolts 29 which fit into countersinks in the flanges to give the reel a smooth exterior surface.

Figure 7:
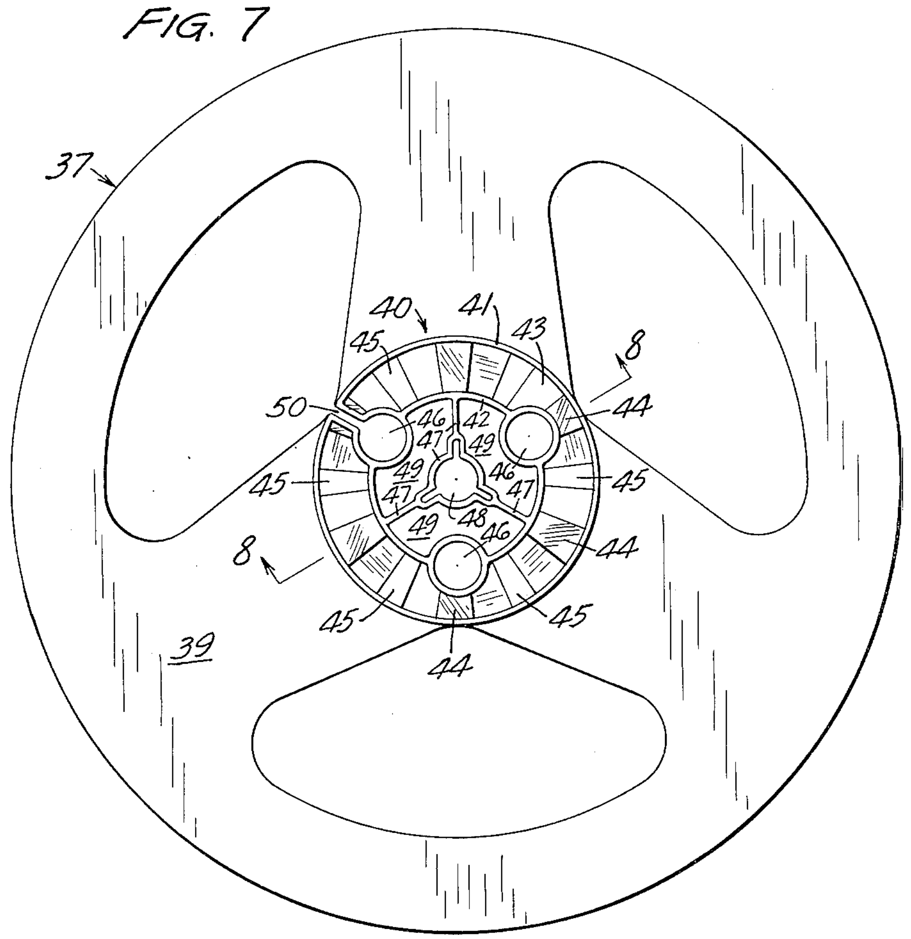
FIG. 7 is a plan view of a one-piece molded plastic reel integrally formed with a core of construction similar to that of the core of FIG. 1.
Figure 8:
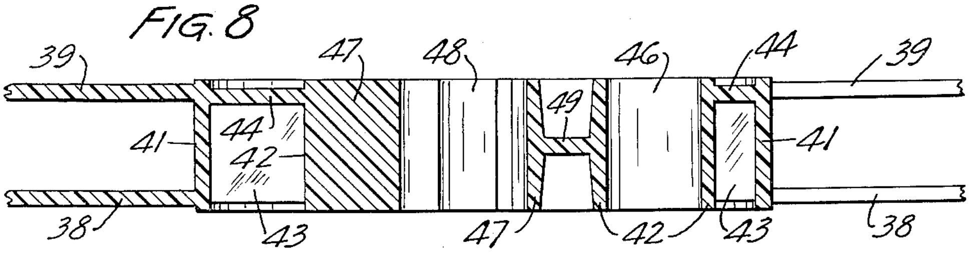
FIG. 8 is an enlarged cross section along line 8—8 of FIG. 7.

Referring now to FIGS. 7 and 8, the reel 37 is molded of plastic in one piece with a pair of flanges 38 and 39 and a core 40, similar in design to the cores 10 and 20 described hereinabove. The outer rim 41 and the inner rim 42 are joined by a continuous web 43 which alternates symmetrically from one side of each rim to the other. The slope of the web between adjacent short flat crowns 44 and 45 is about 45 degrees with respect to the edge of the outer rim 41.

The inner rim 42 is formed to provide three ridged circular openings 46 which engage drive-pins of a magnetic recorder. Ribs 47 extending radially inwardly from the inner rim 42 are shaped to provide a central opening 48 adapted to receive the sprocket drive used on many tape recorders. A thin flat central member 49 lends support to the network of ribs 47. A break 50 in the outer rim 41 and the web 43 facilitates thread-up of magnetic recording tape. Even if the web were interrupted for short spaces at other points for thread-up or other purposes, the web would still be substantially "continuous" for all practical purposes as long as it supported the outer rim over its full length. However, the outer rim upon which tape is wound should have no break greater than about 0.075 inch, or magnetic recording tape might be distorted when wound on the reel.

The reel 37 is primarily intended for home or office use, with a maximum overall diameter of about 7 inches for storage of up to 2400 feet of magnetic recording tape. In such use, this reel molded of polystyrene or other nonreinforced plastic easily withstands maximum winding stresses without warping, eccentric deflection, cold flow or any other evidence of structural weakness. Since the reel has no thick sections, it may be molded at high production rates to provide substantial reduction in cost compared to two-piece reels now being marketed commercially.

The webs of each of the novel cores illustrated in the drawing have flat crowns and flat sections connecting adjacent crowns, because this basic design is easy to tool for plastic injection molding, metal casting or forging, compression molding using powdered metallurgy techniques, etc. Finished cores and reels have a pleasing appearance. If tooling costs were less significant, the web could have a sine-wave contour with essentially equivalent structural results. Less expensive modifications would be to make the crowns sharp or somewhat rounded, with the sections of the web connecting adjacent crowns still being flat.

I claim:

1. A magnetic recording tape reel having a central core comprising a tape-receiving cylindrical outer rim, the diameter of which is at least as great as its width, a cylindrical inner rim concentric with the outer rim, and a framework joining said outer and inner rims and integral therewith, said framework comprising a substantially continuous web of uniform thickness alternating symmetrically from crowns at one side of the outer rim to crowns at the other side, the average slope of the web between each crown at one side of the outer rim and the adjacent crown at the other side being 25°–65° to the edge of the outer rim, the maximum circumferential distance between the centers of said adjacent crowns at the outer rim being 3 times the width of the rim, and the web including at least three crowns on each side; and a circular flange extending radially outwardly from each edge of the outer rim.

2. A magnetic recording tape reel having superior dimensional stability under compressive stresses incurred on winding tape thereon, said reel comprising a central core consisting of a tape-receiving cylindrical outer rim, the diameter of which is at least as great as its width, a cylindrical inner rim of the same width as the outer rim and concentric therewith, and a framework joining said outer and inner rims and integral therewith, said framework comprising a substantially continuous web of uniform thickness alternating symmetrically from crowns at one side of the rims to crowns at the other side, the major portion of the web consisting of flat areas extending orthogonally to the rims at angles of 25°–65° to the edges of the rims and traversing at least half the width of the rims, the web including at least three crowns on each side; and a circular flange formed integrally with said central core and extending radially outwardly from each edge of the outer rim.

3. A magnetic recording tape reel as defined in claim 2 wherein the reel is molded of plastic in a single piece.

4. A core for convolutely wound magnetic recording tape comprising a tape-receiving cylindrical outer rim, the diameter of which is at least as great as its width, a cylindrical inner rim concentric with the outer rim, and a framework joining said outer and inner rims and integral therewith, said framework comprising a substantially continuous web of uniform thickness alternating symmetrically from crowns at one side of the outer rim to crowns at the other side, across at least half the width of the rim, the average slope of the web between each crown at one side of the outer rim and the adjacent crown at the other side being 25°–65° to the edge of the outer rim, the maximum circumferential distance between the centers of said adjacent crowns at the outer rim being 3 times the width of the rim, and the web including at least three crowns on each side.

5. A core as defined in claim 4 wherein the portions of the web connecting adjacent crowns are flat and have a slope of about 45° to the edge of the outer rim.

6. A core as defined in claim 4 wherein the web is formed with flat areas at the crowns, which areas are small in comparison to the portions of the web between adjacent crowns.

7. A magnetic recording tape reel comprising a thin-walled cylindrical hub, a circular flange extending radially outwardly from each end of the hub, and a core as defined in claim 4 mounted at each end of the hub with the outer rim of each core in firm contact with the inner-facing surface of the hub.

8. A core for convolutely wound magnetic recording tape comprising a tape-receiving cylindrical outer rim, the diameter of which is at least as great as its width, a cylindrical inner rim of the same width as the outer rim and concentric therewith, and a framework joining said outer and inner rims and integral therewith, said framework comprising a substantially continuous web of uniform thickness alternating symmetrically from crowns at one side of the rims to crowns at the other side, the major portion of the web consisting of flat areas extending orthogonally to the rims at angles of about 45° to the edges of the rims and traversing at least half the width of the rims, the web including at least three crowns on each side.

References Cited in the file of this patent

UNITED STATES PATENTS

| | | |
|---|---|---|
| 1,962,959 | Kinloch | June 12, 1934 |
| 2,152,522 | McCann | Mar. 28, 1939 |
| 2,152,523 | McGuire | Mar. 28, 1939 |
| 2,229,722 | Bureau | Jan. 28, 1941 |
| 2,476,928 | Thomas | July 19, 1949 |
| 2,679,988 | Morgan | June 1, 1954 |
| 2,693,918 | Bretson et al. | Nov. 9, 1954 |